March 12, 1968 S. F. RAK 3,373,351
PROBE TO INDICATE RESISTANCE CHANGES IN ION EXCHANGE
MATERIAL IN A WATER SOFTENER
Filed Feb. 16, 1967 3 Sheets-Sheet 1
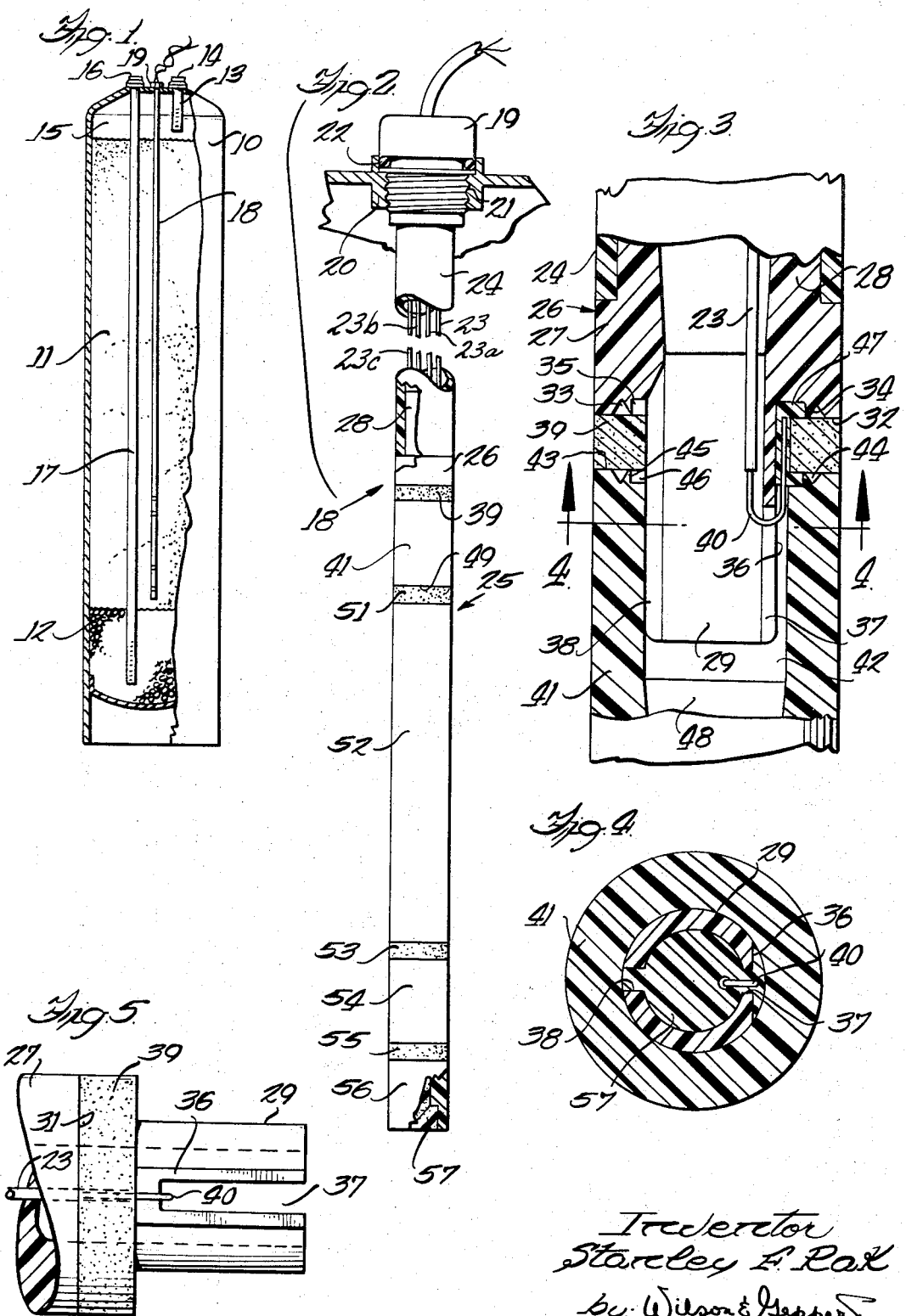
Inventor
Stanley F. Rak
by Wilson & Geppert
Attys

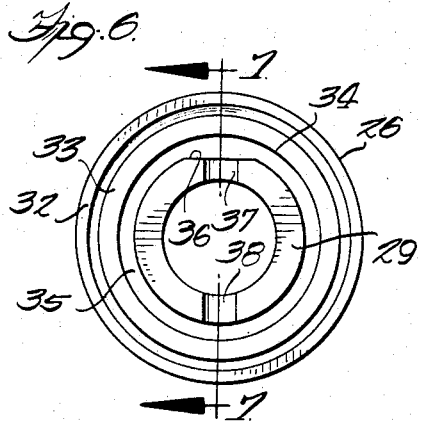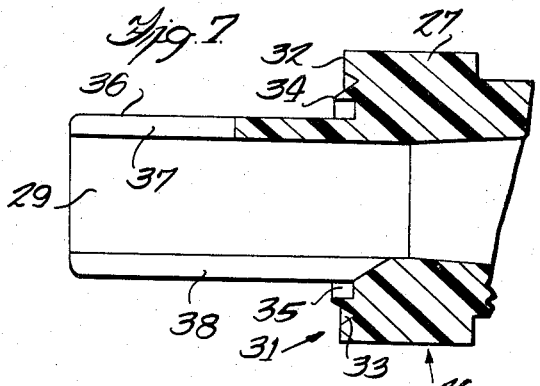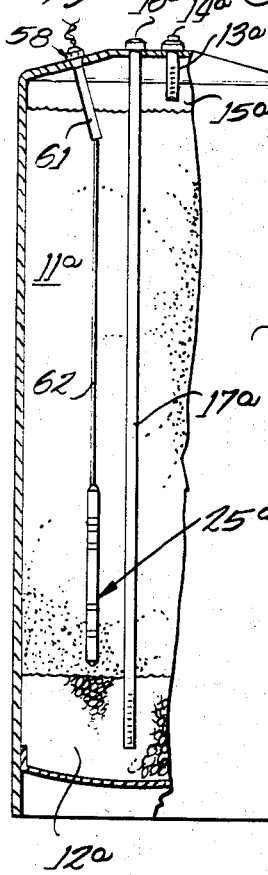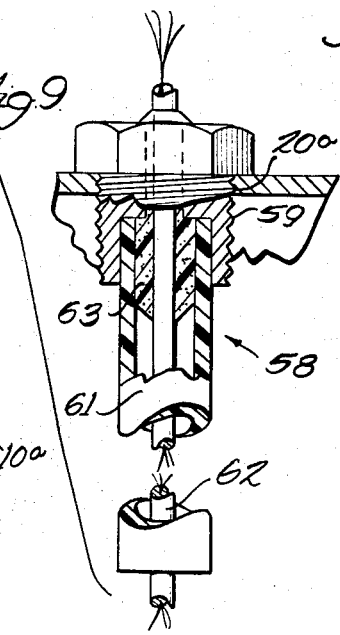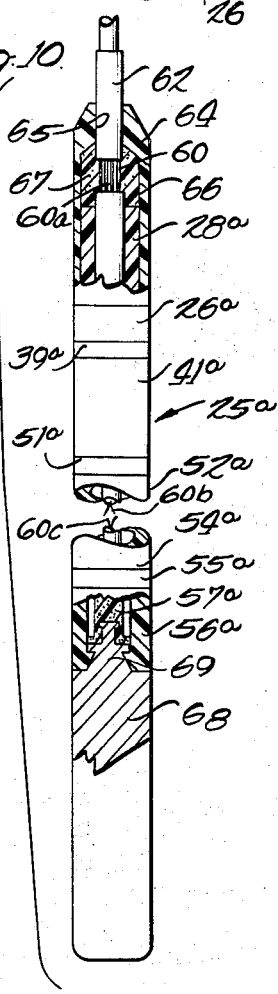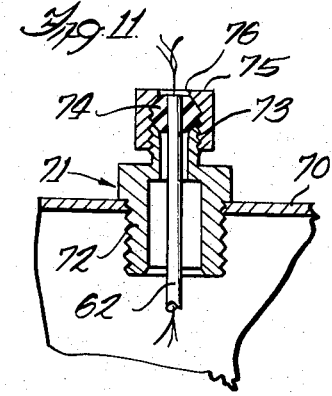

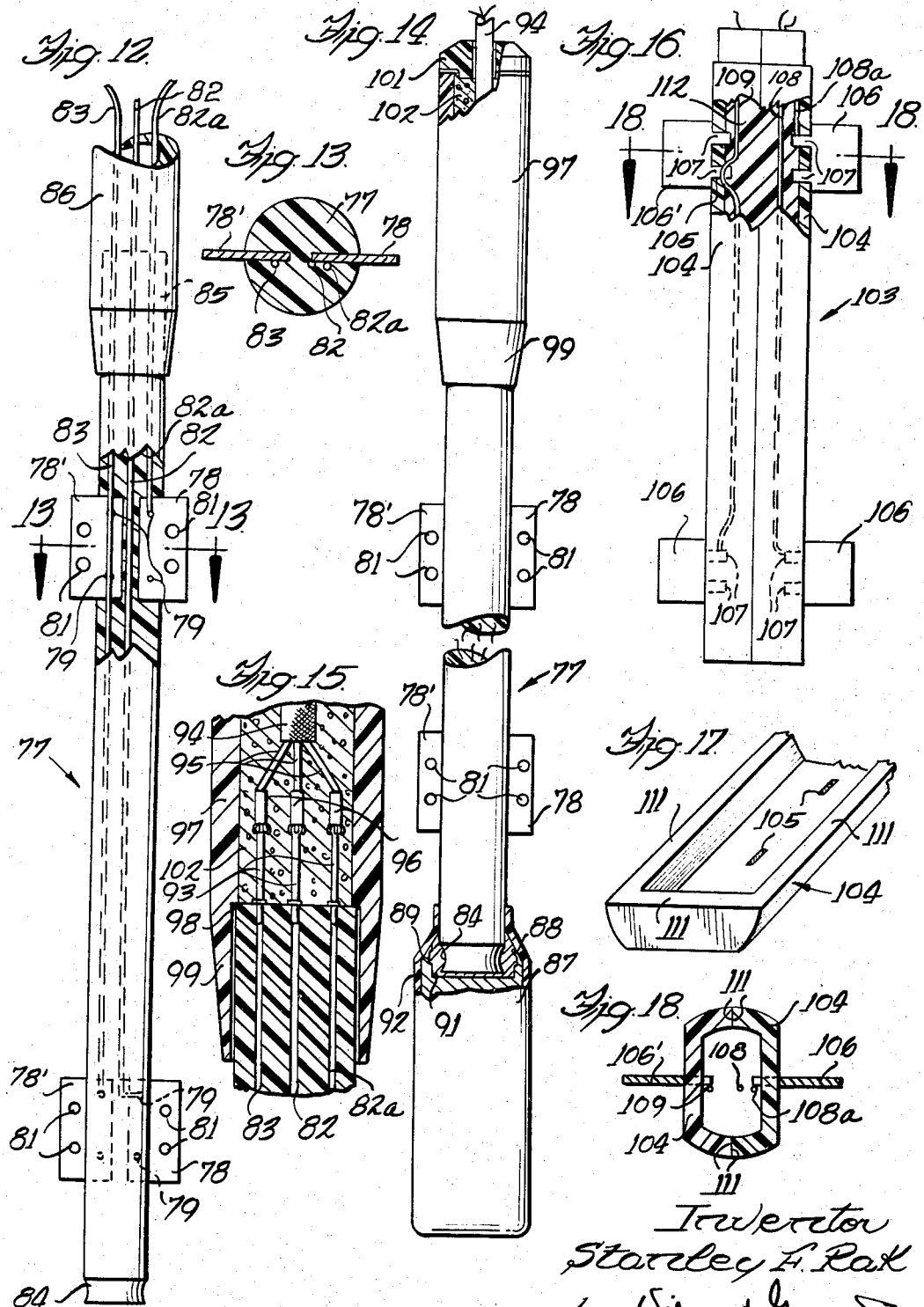

United States Patent Office 3,373,351
Patented Mar. 12, 1968

3,373,351
PROBE TO INDICATE RESISTANCE CHANGES IN ION EXCHANGE MATERIAL IN A WATER SOFTENER
Stanley F. Rak, Mundelein, Ill., assignor to Culligan, Inc., Northbrook, Ill., a corporation of Delaware
Continuation-in-part of application Ser. No. 583,164, Sept. 30, 1966. This application Feb. 16, 1967, Ser. No. 629,049
20 Claims. (Cl. 324—30)

ABSTRACT OF THE DISCLOSURE

A nonconductive resistance sensing probe unit having spaced electrodes in the probe; which probe is inserted into the top of a resin-filled water conditioning tank and positioned therein adjacent the bottom of the resin bed to sense the change in resistance of the resin bed as it is exhausted. Leads from the electrodes extend up through the probe to the exterior of the tank to actuate a control circuit for regeneration of the resin in the tank.

Specification

This application is a continuation-in-part of my copending application Ser. No. 583,164 filed Sept. 30, 1966, now abandoned.

The present invention relates to improvements in resistance sensing probes and more particularly to resistance sensing probes formed as a unitary structure which are to be inserted into and positioned in the conditioning material of a water softening or conditioning tank for the measurement of the change in resistance of the material.

Resistance sensing probes have been used in water softening or conditioning systems to measure the resistance of the water passing therethrough or to measure the resistance of the ion exchange resin and thus indicated the exhaustion of the system and indicate when regeneration of the system is necessary. However, the use of the sensing probes has been limited to laterally extending probes inserted into the side wall of a resin tank or the probes are inserted through an opening in the top or bottom of the tank and are either unsupported or supported on the outlet conduit extending downward into the tank. The present invention obviates the problems attendant to the prior probe systems and their installation by providing a self-contained probe unit that can be independently inserted into the tank through an opening in the top thereof.

An important object of the present invention is the provision of a self-contained resistance sensing probe for a water conditioning tank where the resistance sensing electrodes and the wiring leading thereto are all provided in a substantially rigid housing unit therefor which is inserted through an opening in the top of the tank to be properly positioned in the resin. The electrodes for the probes comprise annular rings formed of an inert electrical conductor which are accurately positioned in the plastic housing of the probe. The wires to be connected to each electrode are carried down the hollow interior of the tubular plastic housing and are suitably secured to their respective electrodes.

Another object of the present invention is the provision of a resistance sensing probe formed of tubular plastic members where the wires for the electrodes are connected to the electrodes and the entire hollow probe is filled and sealed with a suitable insulating resin prior to use. The tubular spacing members have reduced or pilot ends forming shoulders against which the electrodes abut; the annular electrodes fitting over the reduced ends of the tubular members. The reduced end is flattened on one side or surface and the end is slotted for its entire end opposite the flattened surface and the flattened surface is partially slotted to receive the end of the lead-in wire for the electrode. A conductive plastic resin is inserted into the space created by the flattened surface to connect the exposed end of the wire to the electrode, and the central hollow passage of all the spacer members is then filled with an insulating resin.

A further object of the present invention is the provision of a resistance sensing probe where the sensing portion is attached to a suitable fitting through a generally rigid intermediate tubular plastic member to form a generally rigid elongated member. This member is inserted into the tank through an opening and the fitting is secured in the tank opening to provide a predetermined position of the probe in the tank.

The present invention also comprehends the provision of a resistance sensing probe structure for use in large industrial installations where headroom is limited or the unit is of such a height that the utilization of an elongated rigid probe would be prohibited. The resistance sensing probe unit having the electrodes comprising an inert electrical conductor such as graphite or platinized metal resistance sensing rings separated by tubular insulating members remains identical to the probe of the rigid structure, but the resistance sensing unit is sealed and the wires from the probe are encased in a flexible sheath or jacket which is secured within a fitting threadedly secured to the top of the tank. As the wiring and sheath are flexible, this construction provides a dangling or gravity oriented probe having a weight at its lower end which will hang in the tank and, due to the fluidized condition of the bed, assumes a suitable position of alignment at a predetermined depth.

The present invention further comprehends the provision of additional embodiments of a resistance probe unit which can be utilized at the lower end of a relatively rigid tubular member or as a dangling probe. The electrodes are flat plates which extend radially outward from opposite sides of the probe at two spaced positions with the spaced electrodes at one side of the probe being connected to the common wire lead. The probe can be either directly molded around the plate-like electrodes or the probe can be formed of a longitudinally split shell receiving the electrodes and lead wires, which shell is then filled with a non-conductive plastic sealing compound.

Further objects are to provide a construction of maximum simplicity, efficiency, economy and ease of assembly and operation, and such further objects, advantages and capabilities as will later more fully appear and are inherently possessed thereby.

In the drawings:

FIGURE 1 is a view part in side elevation and part in vertical cross section of a water conditioning tank having a generally rigid resistance sensing probe therein.

FIG. 2 is an enlarged side elevational view with parts broken away of the rigid resistance sensing probe of FIG. 1.

FIG. 3 is a further enlarged fragmentary view partly in side elevation and partly in cross section showing the mounting and wiring of one electrode on the probe prior to sealing.

FIG. 4 is a view in horizontal cross section taken on line 4—4 of FIG. 3, but with the insulating sealing resin filling the unit.

FIG. 5 is an enlarged partial side elevational view of a tubular spacer member with the electrode and lead-in wire.

FIG. 6 is an end elevational view of the tubular spaced member of FIG. 5 with the electrode and wire omitted.

FIG. 7 is a cross sectional view of the tubular spacer member taken on the line 7—7 of FIG. 6.

FIG. 8 is a view partly in side elevation and partly in cross section of a water conditioning tank utilizing a second embodiment of resistance sensing probe.

FIG. 9 is an enlarged view partly in side elevation and partly in cross section showing the upper portion of the probe of FIG. 8.

FIG. 10 is an enlarged view partly in side elevation and partly in cross section of the lower portion of the probe of FIG. 8 showing the dangling resistance sensing portion of the probe.

FIG. 11 is an enlarged cross sectional view of another embodiment of mounting structure for the upper end of the probe of FIG. 8.

FIG. 12 is a front elevational view of a second embodiment of resistance sensing probe secured to the lower end of a generally rigid elongated plastic tube with portions broken away.

FIG. 13 is a horizontal cross sectional view taken on the line 13—13 of FIG. 12.

FIG. 14 is a front elevational view of the second embodiment of resistance sensing probe utilized as a dangling probe suspended on a flexible sheath with portions broken away.

FIG. 15 is an enlarged vertical cross sectional view of a portion of the adapter for the flexible sheath and the upper end of the resistance sensing probe.

FIG. 16 is a front elevational view of a third embodiment of resistance sensing probe with a portion broken away showing a two-part shell receiving the electrodes and filled with a nonconductive plastic sealing compound.

FIG. 17 is a partial perspective view of the lower end of one shell half of the probe of FIG. 16.

FIG. 18 is a horizontal cross sectional view of the probe taken on the line 18—18 of FIG. 16.

Referring more particularly to the disclosure in the drawings wherein is shown illustrative embodiments of the present invention, FIG. 1 discloses a water conditioning tank 10 containing a bed 11 of an ion exchange resin, and the tank 10 may have a bed of gravel 12 on which the ion exchange resin rests. A short inlet manifold 13 depends into the tank from a suitable fitting 14, the manifold being slotted to distribute hard water from a source thereof into the freeboard space 15 above the resin bed 11. Depending from a second fitting 16 is an elongated outlet manifold 17 having a slotted lower end to receive treated water that has passed through the resin; the outlet manifold communicating with a service conduit (not shown) leading to the various outlets in a home or industrial installation using the treated water.

An elongated resistance sensing probe 18 extends into the tank and resin bed 11 through a third threaded opening 20 in the top of the tank 10 with a fitting or plug 19 threadingly engaging the opening 20 by the external threads 21 to seal the probe in the tank. The fitting 19 includes an annular groove for a sealing O-ring 22 and a central passage for the introduction of the lead-in wires 23, 23a, 23b and 23c into the probe. The fitting or plug is preferably formed of a suitable plastic material having insulating properties. Depending from the fitting or plug 19 is an elongated plastic tube 24 preferably formed of the same plastic composition as the plug 19, and the tube 24 is solvent-welded to the plug to form a watertight joint.

Solvent-welded to the opposite end of the plastic tube 24 is the resistance sensing probe unit 25 which comprises plural plastic members and electrodes joined together. An adapter 26 is located at the upper end of the probe unit 25 and includes a cylindrical portion 27, a reduced diameter projection or neck 28 conformably received in the lower end of the tube 24 and a reduced neck 29 on the opposite end defining a shoulder 31 (see FIG. 7). The shoulder is provided with an outer annular flat portion 32, a generally V-shaped annular groove 33 providing a sharp annular ridge 34 and an inner annular groove 35. The reduced neck 29 is provided with a longitudinally extending flattened surface 36 (see FIGS. 5 and 6) along the entire length thereof. The neck 29 includes a longitudinally extending slot 37 along a portion of the neck at the flattened surface 36 and a second longitudinal slot 38 opposite slot 37 and extending the length of the neck 29.

An annular electrode 39 formed of an inert electrical conductor such as a graphite or platinized metal ring and having an internal diameter substantially equal to the external diameter of the neck 29 is slipped over the neck 29 and abuts the flat annular surface 32 and the annular sharp ridge 34. A hollow bushing 41 having a cylindrical passage 42 at one end is slipped over the neck 29 with the outer surface abutting the opposite end of the electrode 39. The outer surface of the bushing 41 is also provided with an annular flat surface 43, annular V-shaped groove 44, sharp annular ridge 45 and inner annular groove 46 identical to the configuration of the shoulder 31 on the adapter 26. The bushing 41 is urged against the electrode 39 so that the ridges 34 and 45 are forced partially into the electrode when the surfaces 32 and 43 abut the electrode to promote sealing of the unit.

A lead-in wire 23 having a bare end 40 (FIG. 3) is bent into the slot 37 and extends into the space between the neck 29 and the electrode 39 formed by the flattened surface 36, and an electrically conducting bonding composition 47 is inserted into the space to bond the wire end 40 to the electrode 39; the bonding composition preferably being a plastic resin such as an electrically conductive epoxy resin.

Forwardly of the end of the neck 29, the cylindrical passage 42 terminates and merges into a converging passage 48. The bushing extends to a shoulder 49 defining a second reduced neck identical to the configuration of the neck 29 of adapter 26, and the shoulder 49 is identical in configuration to the shoulder 31. A second electrode 51 is sandwiched between the shoulder 49 of the bushing 41 and the end of a second bushing 52. The bushing 52 is identical to the bushing 41 except that the length of bushing 52 is approximately three times the length of bushing 41.

A third electrode 53 is sandwiched between the opposite shouldered end of bushing 52 and the end of a third bushing 54 which is identical in configuration and length with the bushing 41. A fourth electrode 55 is located between the opposite shouldered end of bushing 54 and a cap 56 forming the lower end of the probe unit 25. The cap 56 (see FIG. 2), has a generally cylindrical passage therethrough; which passage is stepped adjacent the lower end. In a like manner the end of lead-in wire 23a is bonded to electrode 51, wire 23b to electrode 53, and wire 23c to electrode 55. Once all the wires have been properly secured by use of the electrically conductive epoxy resin, the electrodes, adapter 26, bushings 41, 52, 54 and cap 56 are held together and the interior central passage extending through these parts is filled with an electrical insulating sealing composition 57, such as an insulating epoxy resin. This resin 57 also fills in the slots 37 and 38 of each member and the remaining space created by the flattened surfaces of the members. The probe unit 25, once completed, is then attached to the tube 24 by a solvent weld. The lead-in wires 23, 23a, 23b, and 23c are firmly fixed in place in the probe in the insulating epoxy resin.

The two pair of electrodes 39, 51 and 53, 55 are connected through the lead-in wires 23, 23a, 23b and 23c, respectively to a bridge circuit, such as disclosed in the Harold D. Ritchie Patent No. 3,159,573, issued Dec. 1, 1964, for "Resistance Sensing Probe System," the bridge circuit indicating the resistance of the ion exchange resin bed 11 in the areas of the two sets of electrodes; with two electrodes 51 and 53 being the common reference electrodes and the electrodes 39 and 55 being the sensing electrodes. As exhaustion of the resin moves progressively downward through the bed, when the resistances at the two sets of electrodes reaches a predetermined imbalance, as sensed by the bridge circuit, the circuit initiates a regeneration operation of the resin.

FIGS. 8 to 10 disclose a second embodiment of sensing probe for use in industrial and other installations where the tank is fairly large and head room above the tank is limited. The structure of the tank is generally the same although the tank 10a is generally larger in size, and the probe unit 25a has substantially identical structure except for the end pieces and the same parts will be denoted with the same reference numerals having a superscript a. The tank 10a has a resin bed 11a resting on gravel 12a and an inlet manifold 13a and an outlet manifold 17a depending from fittings 14a and 16a, respectively.

A resistance sensing probe is inserted into the tank 10a through a separate opening 20a in the tank top wall or in an access-hole cover; the probe comprising an upper tank fitting 58 having a threaded member 59 engaging a threaded opening 20a in the tank 10a and a plastic tube 61 is inserted into the lower end of the member 59. The lead-in wires 60, 60a, 60b, and 60c are enclosed in a flexible plastic tube or sheath 62, and the sheath is positioned in the tube 61 and sealed in the threaded member 59 by a resilient sealing washer or compression gland 63, preferably made of a suitable rubber composition. The tube 61 depends from the member 59 into the top layers of ion exchange resin 11a as seen in FIG. 8. The lead-in wires 60, 60a, 60b, and 60c respectively and protective sheath 62 depend below the tube 61 into the resin to the resistance sensing probe unit 25a positioned adjacent the bottom of the resin bed 11a.

The probe unit 25a includes electrodes 39a, 51a, 53a and 55a connected to lead-in wires 60, 60a, 60b, and 60c, respectively, and separated and positioned by adapter 26a, bushings 41a, 52a, 54a and cap 56a. An upper sealing cap 64 is reduced at its upper end and has a central passage 65 receiving the sheath 62. The passage enlarges at 66 to receive the upper reduced end 28a of the adapter 26a, and a rubber seal 67 in the cap 64 surrounds the lower end of the sheath 62 and the lead-in wires extending into the adapter 26a.

At the lower end of the probe unit 25a, a suitable weight 68, such as a lead or brass weight, has an upper end with a stepped undercut surface 69. This surface is inserted into and is retained in the insulating epoxy resin 57a filling the interior of the probe unit. The weight 68 causes the probe unit to behave as a pendant and to align itself along a line parallel to the force of gravity. The use of this suspension probe has the following advantages.

(1) A single installation hole is required.

(2) The installation hole is in the top of the tank or an access-hole cover and installation is effected by dropping the probe through the hole. No draining of the water and resin is necessary.

(3) Insertion of the probe can be accomplished with low ceilings.

(4) Adjustment of the probe elevation within the softener tank can be easily accomplished by effecting the seal at the desired location along the conductor sheath.

FIG. 11 discloses a second embodiment of fitting 71 utilized with the dangling probe unit 25a in the industrial tank 10a. This fitting is adapted for use in a threaded opening in the top of the tank or an access-hole cap 70. The fitting includes a hollow stepped member having an enlarged externally threaded portion 72 received in the opening in the tank or cover 70 and an upper threaded portion 73 of reduced diameter. An internally threaded cap 75 receives a resilient sealing member 74 and engages the threaded portion 73 to compress the sealing member 74. The sheath 62 for the lead-in wires extends through an opening in the member 74 to seal the wires therein.

FIGS. 12–14 disclose another embodiment of a resistance sensing probe unit 77 having four plate-like electrodes 78, 78, 78′, 78′ which are formed of an inert electrical conductor, preferably platinized titanium. Each electrode 78 and 78′ has two or more spaced openings 79 adjacent its inner longitudinal edge receiving material of the molded probe unit therein to form an interlock with the probe material, and one or more openings 81 utilized to position the electrode in a suitable mold for the probe unit on locating pins therein. The electrodes are positioned in pairs with each pair 78, 78′ extending from diametrically opposite sides of the probe unit 77. The electrodes 78, 78 form the upper sensing and lower reference electrodes, the upper electrode 78 connected to an end of lead-in wire 82 and the lower electrode 78 connected to an end of wire 82a; each lead-in wire having its end spot welded or soldered to its respective electrode. The wire 83 is the common wire and is connected to both common electrodes 78′, 78′. By locating both common electrodes 78′, 78′ on the same side of the probe unit, a better signal is obtained from the probe unit.

To form the probe unit around the electrodes, the electrodes are positioned in a suitable mold and an insulating plastic material, such as an epoxy resin, is molded around the inner edges of the electrodes and into the openings 79, and around the connected wires 82, 82a and 83, preferably by a transfer molding operation. This type of molding operation takes the epoxy resin in a powder form, heats a sufficient quantity of the resin to fill the mold cavity to a fluid state, and forces the fluid plastic resin into the mold cavity under pressure, after which the resulting probe unit is cooled and removed from the mold. Any resulting flash or sprue is removed after the formed probe unit is ejected from the mold.

As seen in FIG. 12, the lower end of the formed probe unit 77 has an annular undercut groove or channel 84 formed in the circumference thereof for a purpose to be later described. The upper end 85 of the probe unit 77 is received in and cemented to the lower end of a generally rigid tubular support 86 which depends from a fitting secured in the top of the tank (not shown) similar to that shown in FIG. 2. The wires 82, 82a and 83 extend up from the probe unit 77 through the tube 86 to the exterior of the tank for connecting to a control circuit as previously described.

This probe unit 77 may also be utilized as a dangling probe unit as in FIG. 14 by the addition of a weight at the lower end thereof. The weight for the probe unit comprises a suitable metal weight 87 having a central recess 88 with an annular undercut groove 89 therein to receive a suitable cement 91 that fills in the recess 88 and fills into the annular groove 89 in the recess in the weight and the annular groove 84 at the lower end of the probe unit. An insulative coating or sheath 92 covers the weight 87 and its junction with the probe unit.

At the opposite or upper end of the probe unit (FIG. 15), the wires 82, 82a and 83 terminate in metal pins or prongs 93 embedded in the probe unit 77 and projecting upward therefrom. A flexible sheath 94 covers the three wires 95 from the control circuit actuated by the probe unit; the wires terminating in clips or spring sockets 96 adapted to engage the exposed ends of the pins 93. An adapter or tube 97 has a shouldered recess 98 in the lower tapered end 99 thereof to receive the upper end of the probe unit (see FIG. 15). The adapter 97 terminates at an open upper end adapted to be closed by a cap 101 encompassing the sheath 94. The adapter 97 is filled with a nonconductive sealing cement or plastic 102 and the cap 101 urged onto the adapter to seal the wires and secure the probe unit 77 to the flexible sheath 94; the upper end of the sheath being suitably sealed in the upper end of the tank as shown in FIG. 9 or FIG. 11.

A third embodiment of resistance sensing probe unit 103 is shown in FIGS. 16–18. This embodiment may be used with the generally rigid support tube 86 of FIG. 12 or may be secured to the flexible sheath 94 by the adapter 97 and cap 101 as seen in FIG. 14. The probe unit 103 is formed from a pair of identical plastic shell halves 104, each shell having two pair of slots 105 vertically aligned and spaced along the shell half 104. Each pair of slots 105 receives a pair of projections 107 on the edge of a plate-like electrode 106 or 106'. The electrodes are again formed of an inert electrical conductor, such as platinized titanium. The projections 107 extending through the slots 105 are preferably sealed therein by a suitable sealing cement, and the two lead-in wires 108, 108ª for the sensing and reference electrodes 106, 106 and common wire 109 for the common electrodes 106' 106' with each wire 108, 108ª and 109 being secured to a projection 107 of its respective electrode.

With the electrodes 106, 106' and lead-in wires 108, 108ª and 109 assembled in the shell halves 104, 104, the shell halves can be solvent welded or otherwise suitably secured along the edges 111 as seen in FIG. 18. Then the interior of the shell halves is filled with a non-conducting epoxy resin 112. The wires 108, 108ª and 109 or the metal pins or prongs (FIG. 15) extend from the upper end of the probe 103 to be connected to the control system for the softener.

While several embodiments of resistance sensing probes of a particular and effective shape have been shown and described by way of illustration, it is not my intent or desire to unnecessarily restrict the improvement by virtue of this limited showing. It is also contemplated that specific descriptive terms employed herein be given the broadest possible interpretation consistent with the actual disclosure.

Having thus disclosed the invention, I claim:

1. A resistance sensing probe for a water conditioning tank to be inserted into the tank through the top thereof, comprising a resistance probe unit positioned in a tank adjacent the bottom thereof and having an upper and a lower end, a fitting secured to the top of the tank, means connecting the probe unit with the fitting, said probe unit including a plurality of electrodes exposed at the outer circumference of the probe unit and spaced longitudinally therealong, a lead-in wire connected to and extending from each of said electrodes with the lead-in wires extending through the connecting means and the fitting, and an electrically non-conductive housing supporting and separating the electrodes including a plurality of hollow tubular bushings, each having a reduced neck at one end to receive thereon one of said electrodes, and each bushing having an enlarged passage therethrough at the opposite end to receive the neck of the adjacent bushing.

2. A resistance sensing probe as set forth in claim 1, in which said electrodes are annular inert electrical conductors arranged in pairs axially spaced on said probe unit.

3. A resistance sensing probe as set forth in claim 1, in which said probe unit has a cap at the lower end thereof receiving the reduced neck of the adjacent bushing, and an adapter located on the upper end thereof between the probe unit and the connecting means, said adapter having at one end a reduced neck similar to those of the bushings and at the opposite end a second reduced neck received in the connecting means.

4. A resistance sensing probe as set forth in claim 3, in which said sensing members are four annular electrodes formed of an inert electrical conductor, and said bushings are of such lengths as to separate the electrodes into two pairs.

5. A resistance sensing probe as set forth in claim 3, in which the reduced neck of each bushing and the adapter has a pair of opposed longitudinally extending slots, one of the slots extending approximately one-half the length of the neck and the opposite slot extending the full length of the neck, said neck having a longitudinally extending flattened surface on the exterior surface and aligned with the short slot.

6. A resistance sensing probe as set forth in claim 5, in which one of said lead-in wires is inserted through the short slot into the space formed between the neck and the adjoining member by the flattened surface, said lead-in wire being secured to the electrode by an electrically conductive plastic composition, and the hollow adapter, bushings and cap are filled and sealed with an electrically insulating plastic.

7. A resistance sensing probe as set forth in claim 5, in which the surfaces abutting the opposite sides of each electrode have an outer annular flat surface, an annular V-shaped groove, an annular sharp ridge and an annular inner groove.

8. A resistance sensing probe as set forth in claim 7, in which the sharp ridges of the surfaces abutting the opposite sides of the electrode are compressed into the sides of the electrode to sealingly engage the ring.

9. A resistance sensing probe as set forth in claim 6, in which the electrically insulating plastic fills the opposed slots in the reduced neck of the adapter and bushing, and the cap has an outwardly stepped interior surface so that the last mentioned plastic secures the probe unit together.

10. A resistance sensing probe as set forth in claim 3, in which the connecting means includes an elongated hollow rigid tube solvent-welded at one end to the adapter and at the opposite end to said fitting.

11. A resistance sensing probe as set forth in claim 3, in which said connecting means includes a flexible sheath covering the lead-in wires, said fitting includes a threaded member, and a compression gland sealing the sheath in the fitting.

12. A resistance sensing probe as set forth in claim 11, in which a cap surrounding the sheath is secured onto said adapter on the probe unit, sealing means in the last mentioned cap surrounding the sheath, and a weight secured to the lower end of the probe unit.

13. A resistance sensing probe as set forth in claim 1, in which an electrically insulating plastic fills the hollow probe unit, and a weight having a stepped undercut shank embedded in the plastic filling the probe unit.

14. A resistance sensing probe for a water conditioning tank to be inserted into the tank through the top thereof, comprising a resistance probe unit positioned in a tank adjacent the bottom thereof and having an upper and a lower end, a fitting secured to the top of the tank, and means connecting the probe unit with the fitting, said probe unit including a plurality of plate-like electrodes extending radially outward from said probe unit and parallel to the axis thereof, said electrodes being arranged in vertically spaced pairs with each pair extending from diametrically opposite sides of the probe unit, a lead-in wire connected to and extending from each of said electrodes with said lead-in wires extending through said connecting means and said fitting, and an electrically non-conductive housing supporting and separating the electrodes.

15. A resistance sensing probe as set forth in claim 14, in which one of each pair of electrodes is a common electrode, said common electrodes being connected to one of the lead-in wires and positioned on the same side of the probe unit.

16. A resistance sensing probe as set forth in claim 14, in which each electrode has an inner edge and said probe unit is molded around the inner edges of the electrodes and the lead-in wires, said electrodes having openings to receive molded material forming the probe unit and providing an interlock.

17. A resistance sensing probe as set forth in claim 14, in which said probe unit is formed from a pair of shell halves that are secured together at their edges, said shell halves being filled with an insulating plastic resin.

18. A resistance sensing probe as set forth in claim 17, in which said electrodes each has a pair of projections at one edge and each shell half has a pair of slots receiving the projections therein and each lead-in wire being secured to one of the projections of an electrode.

19. A resistance sensing probe as set forth in claim 14, in which the lower end of the probe unit is formed with an annular groove in the circumference thereof, a weight having a central recess receiving the lower end of the probe unit and having an annular undercut groove, said recess and groove receiving the grooved end of the probe unit and a suitable cement to secure the weight to the probe unit.

20. A resistance sensing probe as set forth in claim 19, in which said weight is covered with an insulative coating, and the upper end of the probe unit is provided with metal pins embedded in the end of the probe unit and attached to the lead-in wires, an adapter receiving the upper end of the probe and the lower end of a flexible sheath containing circuit wires, clips on the ends of the circuit wires to engage the metal pins, a cap for the adapter, and an insulating sealing cement filling the adapter and embedding the circuit wires, clips and pins.

References Cited
UNITED STATES PATENTS

| | | | |
|---|---|---|---|
| 2,560,209 | 5/1951 | Borell et al. | 324—30 |
| 2,581,979 | 1/1952 | Standing et al. | 324—30 X |
| 2,769,140 | 10/1956 | Obenshain | 324—30 |
| 3,051,631 | 8/1962 | Harbin et al. | 324—30 |
| 3,159,573 | 12/1964 | Ritchie | 324—30 X |
| 3,172,037 | 3/1965 | Pfeiffer | 324—30 |

RUDOLPH V. ROLINEC, *Primary Examiner.*

C. F. ROBERTS, *Assistant Examiner.*